E. PEAK.
GANG-PLOW.

No. 186,269.          Patented Jan. 16, 1877.

WITNESSES:

INVENTOR:
E. Peak
BY
ATTORNEYS.

UNITED STATES PATENT OFFICE.

EZRA PEAK, OF MONTANA, KANSAS.

IMPROVEMENT IN GANG-PLOWS.

Specification forming part of Letters Patent No. 186,269, dated January 16, 1877; application filed July 11, 1876.

*To all whom it may concern:*

Figure 1:
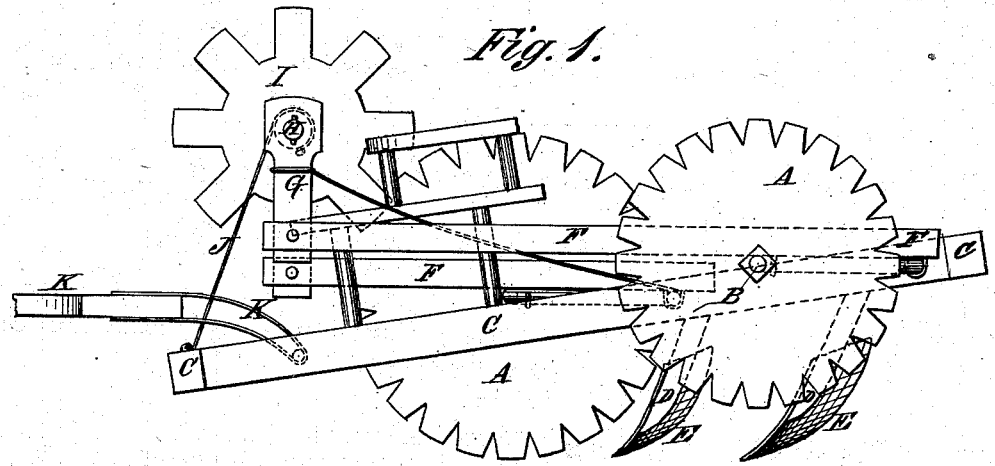
Figure 2:
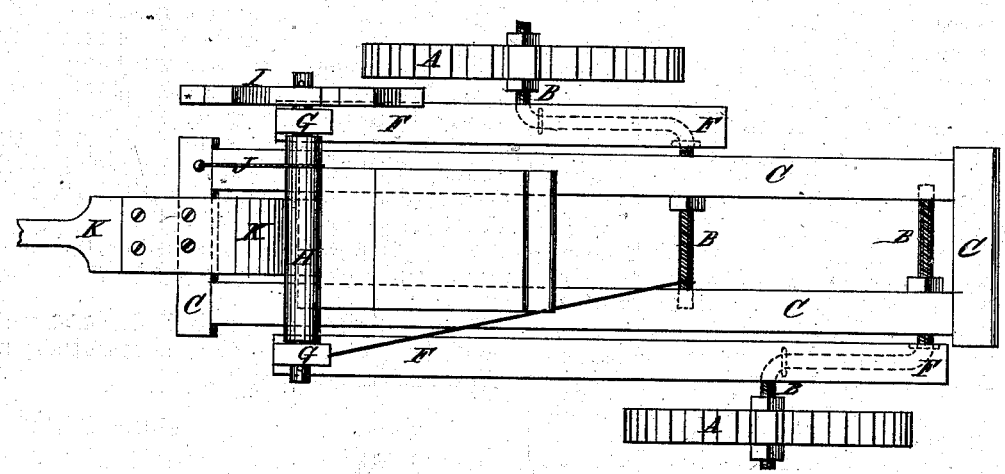

Be it known that I, EZRA PEAK, of Montana, in the county of Labette and State of Kansas, have invented a new and useful Improvement in Gang-Plows, of which the following is a specification:

Figure 1 is a side view of my improved gang-plow. Fig. 2 is a top view of the same.

Similar letters of reference indicate corresponding parts.

The object of this invention is to furnish an improved gang-plow, which shall be so constructed that it may be easily raised from and lowered to the ground, and adjusted to work at any desired depth in the ground, which shall be of lighter draft than plows constructed in the usual way, and which shall be simple in construction and inexpensive in manufacture.

The invention consists in the combination of the notched wheels with the frame of a gang-plow.

A are the wheels, the faces of which are notched to give them a slight up-and-down movement as they are drawn forward, to slightly jar the plows, and thus cause them to be easier drawn than when smooth wheels are used. The wheels A revolve upon the journals of the crank-axles B, the other arms of which work in bearings in the frame C. To the side bars of the frame C, and the one in advance of the other, are attached the standards D, to the lower ends of which the plows E are attached. The wheels A are placed, the one in advance of the other, to throw all the weight upon the wheels, and thus relieve the tongue. The middle parts of the crank-axles B are placed in a horizontal position, and upon said middle parts are laid, and to them are attached, the rear parts of the levers F, to the forward ends of which are rigidly attached two uprights, G, to the upper ends of which is pivoted a shaft, H, having a hand wheel or crank, I, attached to one end. The shaft H should be provided with a ratchet-wheel and pawl to hold it in any position into which it may be turned; and to it is attached a rope or chain, J, the other end of which is attached to the forward end of the frame C, so that by turning the shaft H the plows may be raised from, lowered to, and adjusted to work at, any desired depth in the ground. K is the tongue, the rear end of which is pivoted to the frame C, beneath or a little in the rear of the shaft H.

Having thus described my invention, I claim as new and desire to secure by Letters Patent—

The combination of notched wheels A with the frame C of a gang-plow, substantially as herein shown and described.

EZRA PEAK.

Witnesses:
S. S. WATSON,
R. F. SIMONS.